June 24, 1924.

N. P. STADLER

BEARING SLEEVE PULLER

Filed May 4, 1923

1,499,082

Inventor
N. P. Stadler

By D. Swift

Attorney

Patented June 24, 1924.

1,499,082

UNITED STATES PATENT OFFICE.

NICOLAS P. STADLER, OF IOLA, WISCONSIN.

BEARING-SLEEVE PULLER.

Application filed May 4, 1923. Serial No. 636,597.

*To all whom it may concern:*

Be it known that I, NICOLAS P. STADLER, a citizen of the United States, residing at Iola, in the county of Waupaca, State of Wisconsin, have invented a new and useful Bearing-Sleeve Puller; and I do hereby declare the following to be a full, clear, and exact description of the invention, such as will enable others skilled in the art to which it appertains to make and use the same.

The invention relates to roller bearing sleeve pullers for rear axles of motor driven vehicles, and has for its object to provide a device of this character whereby the roller bearing sleeve may be easily and quickly removed for repair purposes, particularly for packing the same to prevent grease from leaking out. The puller comprises a bar having a right angularly disposed member adapted to engage in a lubricant port in the sleeve, and a right angularly disposed arm adapted to extend over the outer end of the axle spindle, and in which last named arm a screw is threaded which cooperates with the axle spindle, whereby the device may be moved outwardly and the bearing sleeve pulled from the case.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
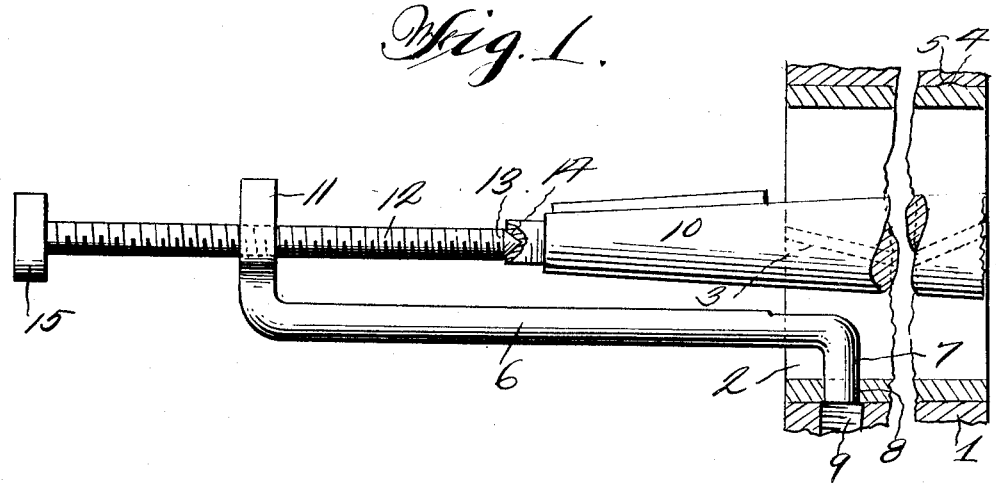
Figure 1 is a side elevation of the device showing the same applied to an axle spindle, and to the sleeve.
Figure 2:
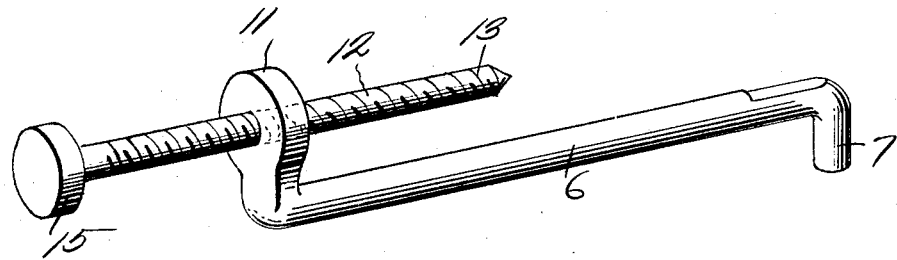
Figure 2 is a perspective view of the device.

Referring to the drawing, the numeral 1 designates the rear axle bearing casing of a motor driven vehicle, and 2 a split bearing sleeve disposed therein, which is split at 3. When the sleeve 2 is placed within the casing 1, it is necessary for said sleeve to be contracted to allow the lug 4 carried thereby to come out of engagement with the depression 5 of the casing 1. The same operation is necessary when removing the sleeve, however upon removal of the sleeve, it is hard to contract the sleeve, and the usual practice is to drive chisels between the sleeve and the casing, which action not only mars the sleeve, but often bends the same to such an extent that it is practically worthless. To remove the sleeve and to obviate the above difficulty, the sleeve puller is particularly designed.

The puller comprises an elongated bar 6, which bar is provided with a right angularly disposed arm 7. The arm 7 is received in the lubricant port 8 in the sleeve 2 after a grease cup has been removed from the port 9 in the casing 1, therefore it will be seen that the lubricant port 8 is utilized, and that the bearing sleeve 2 is not modified in structure. The bar 6 extends outwardly in parallel relation to the axle spindle 10, and is provided with an arm 11, which overlies the end of the spindle 1, and has threaded therein a bolt 12. Bolt 12 is axially disposed in relation to the spindle 10, and has its end 13 in engagement with the depression 14 in the end of the spindle, therefore it will be seen that when the operator rotates the hand engaging member 15 in one direction, the bar 6 will be pulled outwardly in relation to the spindle 10 and the arm 7 thereof will pull the bearing sleeve 2 outwardly. The power obtained is sufficient to force the lug 4 out of the depression 5, which action will contract the sleeve 2 sufficient to allow the sleeve to be pulled from the casing 1 without damage to the sleeve.

From the above it will be seen that a roller bearing sleeve puller is provided for rear axles of trucks and the like, whereby the split sleeves may be easily and quickly removed without damaging the sleeve or casing in which it is disposed. It will also be seen that the device is simple in construction, the parts reduced to a minimum, and the lubricant port 8 utilized for receiving a portion of the puller.

The invention having been set forth what is claimed as new and useful is:—

A bearing sleeve puller adapted to pull bearing sleeves from around axle spindles, said sleeves having oil apertures, said puller comprising a bar, a member carried by said bar and extending at an angle thereto and adapted to be received in an oil aperture of the sleeve, said bar being provided with an angularly disposed member adapted to extend across the axis of the spindle, and a threaded bolt threaded through said last named angularly disposed member and adapted to cooperate with the end of the spindle for imparting a pull on the sleeve.

In testimony whereof I have signed my name to this specification in the presence of two subscribing witnesses.

NICOLAS P. STADLER.

Witnesses:
 Oscar Olson,
 W. L. Jones.